United States Patent Office 2,830,060
Patented Apr. 8, 1958

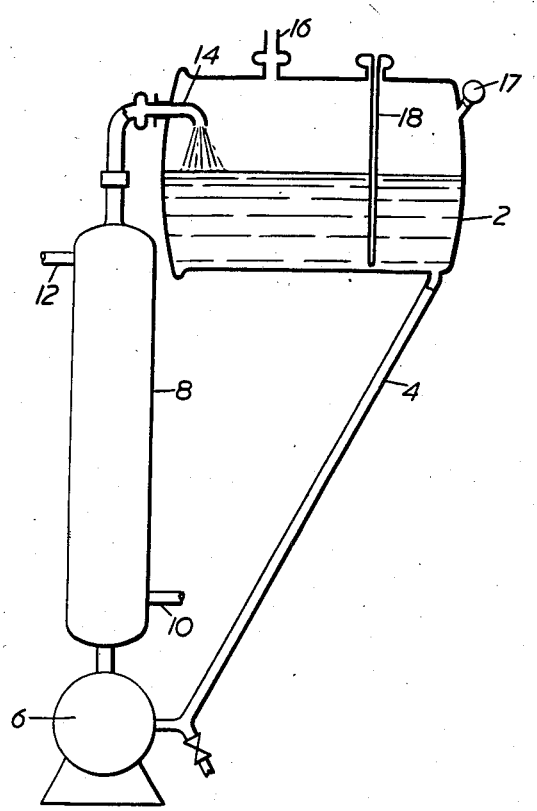

2,830,060

PREPARATION OF ETHYLENE BIS-THIURAM MONOSULPHIDE

Ian Alastair Moncrieff Ford, Birmingham, England, assignor to Robinson Brothers Limited, Oldbury, near Birmingham, England, a British company Application July 2, 1956, Serial No. 595,544

Claims priority, application Great Britain July 20, 1955

9 Claims. (Cl. 260—327)

In the course of work on the fungicidal properties of disodium ethylene bis-dithiocarbamate (S.E.D.), Thorn and Ludwig discovered that by blowing air through a dilute solution of S.E.D., small quantities of a yellow solid were precipitated after a few days. This work is reported in the Canadian Journal of Chemistry, volume 32, 1954, pages 872 to 879. They found that by extracting this solid, which also contains free sulphur, with chloroform, two fractions were obtained: a chloroform-soluble product, which is a powerful fungicide, and a chloroform-insoluble product, which is also a fungicide but less powerful. Analysis of both the soluble and insoluble products after removal of elementary sulphur gave an empirical formula $C_4H_6N_2S_3$ for both and it is believed that both are forms of ethylene bis-thiuram monosulphide (E.T.M.):

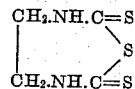

The chloroform-insoluble product is polymeric and its structure a matter of conjecture.

In attempting to reproduce this experimental work with a view to obtaining the highly fungicidal chloroform-soluble form of E.T.M., I found that the yield varied widely and in some cases I failed to obtain E.T.M. at all. Moreover, production was extremely slow.

It is accordingly an object of my invention to provide a reproducible process for the production of E.T.M.

It is a further object to produce E.T.M. in a good yield from S.E.D. and the other di-alkali metal and di-ammonium salts.

Other objects will be apparent hereinafter.

I have now discovered that by introducing various modifications into the process disclosed by Thorn and Ludwig, and carrying out the reaction rapidly the yield of the chloroform-soluble product can be increased and the process rendered more consistent on repetition. Ludwig and Thorn obtained a yield of less than 5% of that theoretically possible, while I find it is possible to get yields up to 50% or over by using the present invention. This is most surprising, as although it is obviously desirable to carry out the reaction as fast as possible it could not be predicted that the yield would increase with increasing speed of reaction. According to this invention a reaction is brought about between a concentrated solution of a di-alkali metal or di-ammonium salt of ethylene bis-dithiocarbamic acid and oxygen in the presence of an oxidation catalyst at a temperature not greater than 25° C. while the solution is agitated vigorously.

While I prefer to use disodium ethylene bis-dithiocarbamate as the starting material, and this specification is concerned mainly with this compound, the other alkali metal salts and ammonium salt can be used. The potassium salt behaves similarly to the sodium salt, but results in slightly lower yields and the ammonium salt does not give such good results as the sodium salt.

Thorn and Ludwig indicated that the solution of S.E.D. must be very dilute to form E.T.M. and said that a solution containing 1 part of S.E.D. in 1000 parts of solution, i. e. a solution of 0.1%, was the best. I have found that solutions much more concentrated than this can be used; by concentrated solution I mean a solution containing at least 1% S.E.D. or equivalent compound. For example, a solution of 365 gms. of pure, hydrated S.E.D. (equivalent to one gram mole of the anhydrous salt) in 36.5 litres of distilled water i. e. a solution of 1%, was mixed with 6.3 gms. manganese sulphate as catalyst and kept saturated with oxygen for one hour. 120 gms. of E.T.M. was obtained.

The concentration may be as high as is obtainable, but the higher the concentration, the reaction being exothermic, the greater the amount of heat which has to be removed to keep the temperature in the required range. Accordingly I prefer that the concentration is not greater than 30% but is above 5%.

Moreover, when working with dilute solutions the mother liquor after precipitation of the yellow solid, still contains a high proportion of the total yield of the fungicidal material. When the solution is concentrated the proportion of active material in the mother liquor is much smaller.

The solution must be agitated vigorously to ensure a complete and rapid reaction. The effect of agitation is to increase the area of contact between the gas and the solution. This vigorous agitation may be carried out by blowing oxygen through the solution, but I prefer to carry out the reaction in a closed container and to introduce oxygen to the container under pressure, for example from a compressed oxygen bottle. In this case there is no excess oxygen to bubble through the solution and I prefer to bring about vigorous agitation by pumping the solution rapidly round a closed circuit including the container. The heat of reaction is conveniently removed by circulating the solution through a cooler.

One method of carrying out the invention will now be described in greater detail with reference to the accompanying drawing which is a diagrammatic view of apparatus used in the process. There is a closed mild steel tank 2, which holds the solution of S.E.D. From the bottom of the tank a pipe 4 leads downwards to a pump 6. The pump is connected to the top of the tank 2 by a cooler 8, provided with inlet and outlet pipes 10 and 12 for the cooling liquid. From the top of the cooler 8 a pipe 14 enters the tank 2 to eject solution into the tank. A source of compressed oxygen is connected to an inlet 16 in the top of the tank. The tank is made pressure tight and provided with a pressure gauge 17 and a pocket 18 for a thermometer. If the tank has a capacity of 24 gallons and is about half-filled with solution the pump conveniently has a capacity of 7,000 gallons per hour so that the solution circulates about 700 times in an hour.

As an example of the increase in the speed of reaction using oxygen under pressure, solutions containing 360 gms. of solid S.E.D. and 0.85 gm. manganese sulphate, as catalyst, for every 5 litres of solution were treated with oxygen under varying pressures. The following results were obtained:

| Oxygen Pressure, p. s. i. g | 2 | 10 | 20 | 40 |
|---|---|---|---|---|
| Reaction time (mins.) | 42 | 27 | 21 | 15 |
| Yield (g.) | 125 | 140 | 133 | 135 |

The higher the pressure of oxygen the more rapid is the reaction and the more difficult is it to control the temperature; I prefer to work at a pressure between 2 and 50 p. s. i. g.

To show that the more vigorous the agitation the shorter the reaction time I give the following example.

Solutions similar to those used in the example described above were circulated at varying rates. Circulation at a rate of 100 changes per hour required 175 minutes for completion of reaction, while at 700 changes per hour the reaction was complete in 18 minutes, the respective yields being 94 g. and 109 g.

The preferred oxidation catalyst is manganese sulphate. Ludwig, Thorn and Unwin, in a paper in the Canadian Journal of Botany, volume 33, 1955, pages 42 to 59 describe the production of manganese ethylene bis-dithiocarbamate by bringing about a reaction between manganese sulphate and S. E. D. They report that aeration of the manganese salt produced E. T. M. Our experiments show that, under similar conditions of strength the manganese salt absorbs oxygen much more slowly than the sodium salt in the presence of a trace of manganese sulphate, and that only small amounts of E. T. M. are formed. The essential difference between the formation of the manganese salt and the use of manganese sulphate as a catalyst lies in the fact that in the first case the amount of manganese is chemically equivalent to the di-thiocarbamic acid present, and in the present case only a catalytic amount is present, for example, between 5 and 10 gms. sulphate for every gm. mole of S. E. D.

It appears that the true catalyst is not manganese sulphate but manganese dioxide as this is the material obtained after the reaction. The activity of manganese dioxide is probably largely due to its formation as a hydrate in situ by the increasing alkalinity of the solution as the reaction proceeds.

The use of oxygen instead of air makes the process much more consistent, and at the same time speeds up the reaction. In some cases I have found that air gives the same results as oxygen, but in most cases the results are much worse and a higher proportion of the product obtained is insoluble in chloroform.

While I prefer to work below 25° C. I find that temperatures up to 40° C. can be used. Above 40° C. the yield and purity of the material decrease. Moreover, while I can work at temperatures down to 0° C. I prefer to work above 10° C. Below 0° C. the speed of reaction is considerably reduced.

The effect of temperature is shown by examples in which solutions of S. E. D. containing 360 gms. of S. E. D. and 0.85 gm. of manganese sulphate for every 5 litres of solution were treated with oxygen at various temperatures. The results were as follows:

| | | | |
|---|---|---|---|
| Initial Temp., ° C | 0 | 20 | 26 |
| Final Temp., ° C | 15 | 31 | 36 |
| Crude Yield (g.) | 156 | 113 | 92 |

Some examples will now be given:

*Example 1*

700 ccs. of a solution containing 27% by weight of hydrated S. E. D. were circulated through the reaction vessel of a laboratory apparatus at a rate of 700 changes per hour. Oxygen was supplied under pressure of about 2 lbs. p. s. i. g., the temperature being maintained below 20° C. for 105 minutes.

The yield of solid was 28.9% by weight, based on the weight of S. E. D., and its purity 80%. The yield of pure E. T. M. was, therefore, equivalent to 48.4% of that theoretically obtainable.

*Example 2*

In a pilot plant similar to that shown in the accompanying drawing, 15 gallons of a solution containing 14% by weight of hydrated S. E. D. were circulated 470 times per hour, while a pressure of oxygen of 20 lbs. p. s. i. g. was maintained in the vessel 2. The temperature was kept at about 25° C. by means of the cooler 8.

At the end of 35 minutes, the solid product was filtered off and amounted to 31% by weight of the S. E. D.; its purity was 83%. The yield of pure E. T. M. was therefore equivalent to 53.8% of that theoretically obtainable.

I claim:

1. A process for the preparation of ethylene bis-thiuram monosulphide which comprises bringing about a reaction between oxygen and a concentrated solution of a compound selected from the group consisting of di-alkali metal and di-ammonium salts of ethylene bis-dithiocarbamic acid, in the presence of a relatively small catalytic amount of a manganese compound selected from the group consisting of manganese sulphate, manganese dioxide and hydrated manganese oxide at a temperature not greater than 40° C. while the solution is agitated vigorously.

2. A process for the preparation of ethylene bis-thiuram monosulphide which comprises bringing about a reaction between oxygen and a concentrated solution of a compound selected from the group consisting of di-alkali metal and di-ammonium salts of ethylene bis-dithiocarbamic acid, in the presence of a relatively small catalytic amount of a manganese compound selected from the group consisting of manganese sulphate, manganese dioxide and hydrated manganese oxide at a temperature not greater than 25° C. while the solution is agitated vigorously.

3. A process for the preparation of ethylene bis-thiuram monosulphide which comprises bringing about a reaction between oxygen and a concentrated solution of a compound selected from the group consisting of di-alkali metal and di-ammonium salts of ethylene bis-dithiocarbamic acid, in the presence of a relatively small catalytic amount of a manganese compound selected from the group consisting of manganese sulphate, manganese dioxide and hydrated manganese oxide at a temperature between 10 and 40° C. while the solution is agitated vigorously.

4. A process for the preparation of ethylene bis-thiuram monosulphide which comprises bringing about a reaction between oxygen and a concentrated solution of a compound selected from the group consisting of di-alkali metal and di-ammonium salts of ethylene bis-dithiocarbamic acid, in a closed container in the presence of a relatively small catalytic amount of a manganese compound selected from the group consisting of manganese sulphate, manganese dioxide and hydrated manganese oxide at a temperature between 10 and 40° C., said oxygen being introduced to said container under pressure and said solution being agitated by pumping it round a closed circuit including said container.

5. A process as claimed in claim 4 wherein the pressure of said oxygen is between 2 and 50 p. s. i. g.

6. A process for the preparation of ethylene bis-thiuram monosulphide which comprises bringing about a reaction between oxygen and a solution containing between 5 and 30% of a compound selected from the group consisting of di-alkali metal and di-ammonium salts of ethylene bis-dithiocarbamic acid, in the presence of a relatively small catalytic amount of a manganese compound selected from the group consisting of manganese sulphate, manganese dioxide and hydrated manganese oxide at a temperature between 10 and 40° C. while the solution is agitated vigorously.

7. A process for the preparation of ethylene bis-thiuram monosulphide which comprises bringing about a reaction between oxygen and a concentrated solution of a compound selected from the group consisting of di-alkali metal and di-ammonium salts of ethylene bis-dithiocarbamic acid in the presence of a relatively small catalytic amount of manganese sulphate at a temperature not greater than 40° C. while the solution is agitated vigorously.

8. A process for the preparation of ethylene bis-thiuram monosulphide which comprises bringing about a reaction between oxygen and a concentrated solution of di-sodium ethylene bis-dithiocarbamate and oxygen in the presence of a relatively small catalytic amount of a manganese compound selected from the group consisting of manganese sulphate, manganese dioxide and hydrated manganese oxide at a temperature between 10 and 40° C. while the solution is agitated vigorously.

9. A process for the preparation of ethylene bis-thiuram monosulphide which comprises reacting oxygen with a 5 to 30% solution of di-sodium ethylene bis-dithiocarbamate in a closed container in the presence of a relatively small catalytic amount of manganese sulphate at a temperature between 10 and 40° C. said oxygen being introduced to said container at a pressure between 2 and 50 p. s. i. g. and said solution being agitated by pumping it round a closed circuit including said container.

References Cited in the file of this patent

Thorn: Canadian J. of Chemistry 32: 872–879 (1954).